Aug. 24, 1926.

H. M. ALBEE 1,597,499

MACHINE FOR FACING VALVE SEATS

Filed March 10, 1926

Inventor
Hugh M. Albee

By O'Niell & Barn

Attorneys

Patented Aug. 24, 1926.

1,597,499

UNITED STATES PATENT OFFICE.

HUGH M. ALBEE, OF ORANGE, MASSACHUSETTS, ASSIGNOR TO THE LEAVITT MACHINE COMPANY, OF ORANGE, MASSACHUSETTS, A CORPORATION OF MASSACHUSETTS.

MACHINE FOR FACING VALVE SEATS.

Application filed March 10, 1926. Serial No. 93,739.

The invention relates to tools or machines for recutting or resurfacing valve seats, of the general type shown in Patents Nos. 913,085 and 1,525,202, issued to The Leavitt Machine Company, of Orange, Massachusetts, and has for its object the provision of a novel form of clamping mechanism between the support and the spindle-carrying sleeve, to facilitate the locking and unlocking of the said parts in making quick and large adjustments of said sleeve and the tool spindle with respect to the work, and to insure a firm and unyielding grip between the sleeve and the support when the clamp is in locking relation, so that fine adjustments of the tool spindle may be made with extreme exactness.

The invention is illustrated in the accompanying drawing, in which:—

Figure 1:
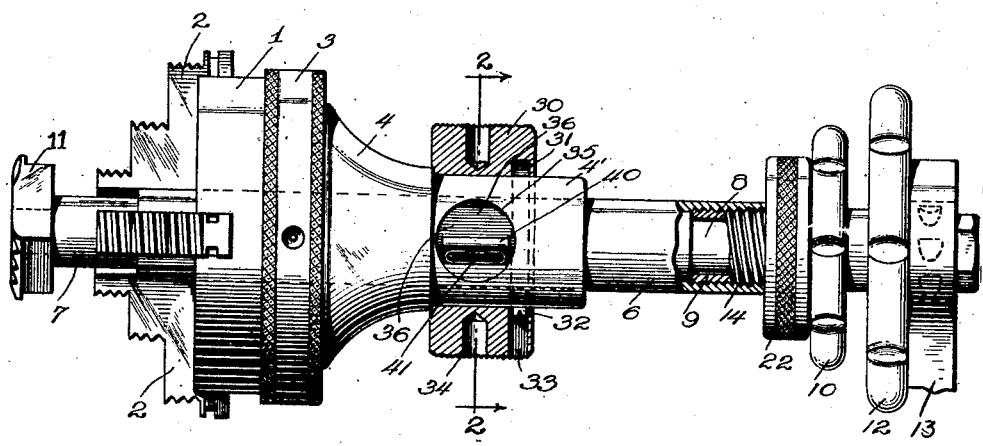
Fig. 1 is an elevation of the device, with certain parts in section.
Figure 2:
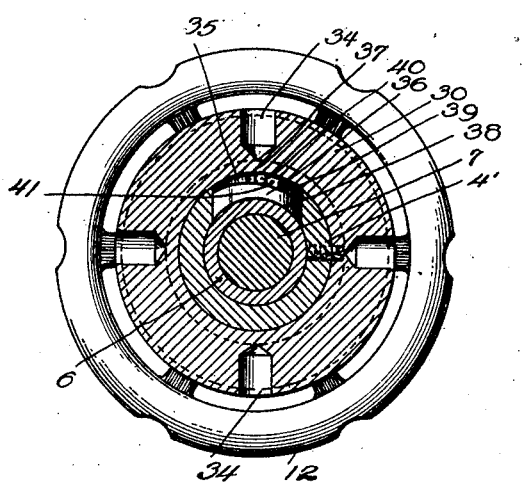
Fig. 2 is a section on line 2—2 of Fig. 1.
Figure 3:
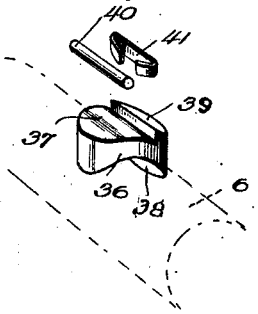
Fig. 3 is an expanded view of the clutch element of the clamp.

Referring to the drawing, 1 indicates the base or support of the machine, the body portion of which is generally cylindrical, with an elongated tapering neck 4, the outer end of which terminates in a cylindrical reduced portion 4'. Radially slidable in the base portion are stepped jaws or chuck members 2, which are adjusted toward and from the longitudinal axis of the base by means of the usual ring 3, rotatably mounted on the base. The base or support is provided with a central longitudinal bore in which is slidably and rotatably mounted a sleeve 6, which constitutes the journal or support for the tool spindle 7, the lower end of which is adapted to receive a facing tool such as 11. The opposite end of the tool spindle is provided with a hand wheel 12 fixed thereto, and also a ratchet handle 13, by means of which the tool spindle is rotated. The upper end of the spindle 7 is reduced in diameter as at 8 and, on this reduced portion, is journalled a sleeve 9, to the upper end of which is secured a hand wheel 10, said sleeve being externally screw-threaded as at 14 to engage the internal screw threads in the upper portion of the sleeve 6, the threaded sleeve 9 also carrying a nut 22 adapted to be turned into engagement with the end of the sleeve 6 and thereby determine the extent of adjustment of the spindle 7 longitudinally of the sleeve 6, which adjustment is effected by turning the hand wheel 10. This construction is common to machines of this general type and is designed for effecting the fine adjustments of the cutting tool 11 with respect to the valve seat to be faced or recut.

In machines of this type it is necessary to clamp the sleeve 6 rigidly to the base during the fine adjustments of the tool spindle with respect to the working and during the cutting operations, which latter are carried out by rotating the tool spindle either by the hand wheel 12 or the ratchet lever 13, and at the same time feeding the tool spindle toward the work by the hand wheel 10. It is also desirable that the sleeve 6, which carries the tool spindle, be freely movable longitudinally of the bore of the base 1, in order that the large or coarse adjustments of the tool spindle with respect to the work, may be expeditiously effected. More or less complicated and not altogether satisfactory means for clamping and unclamping the sleeve to the base are disclosed in the patents hereinbefore referred to and, as indicated, the present invention is designed to provide a simple, durable and efficient form of locking means between the sleeve and the base that may be adjusted to operative or inoperative position with a minimum effort, that is not liable to derangement or injury, that clamps the sleeve securely within the base, prevents movement in any direction, when adjusted to operative position, and that permits free rotation and longitudinal movement of the sleeve within the base, when adjusted to inoperative position, by a slight turning movement of one of the elements of the clamping device.

Mounted on the reduced cylindrical neck portion 4' of the base is a collar 30, having a knurled exterior surface and provided with radial tool-receiving holes 34, so that said collar may be turned either by the fingers or by means of a pin or spanner engaged in any one of the holes 34. Said collar is mounted for free rotation, but without axial movement on the neck 4', these effects being accomplished by means of an annular channel 31 cut in the interior face of the collar, which channel is engaged by a stud 32 threaded into the neck 4', the stud being entered in position through a radial opening 33 in the collar, the head of the stud 32 engaging the channel 31 as shown.

The neck portion 4' of the base is provided with a circular opening 35, in which is fitted a disk-shaped shoe 36, the lower face 38 of which is arcuate and conforms to the outer surface of the sleeve 6, the opposite or upper surface of the shoe being provided with a curved surface 37 eccentric to the arcuate surface 38 and to the inner cylindrical surface of the collar 30, so that the opening between the surface 37 of the shoe and the inner peripheral surface of the collar tapers in a circumferential direction. Adjacent the lower portion of the surface 37 is a shoulder 39, which serves to retain a cylindrical pin or roller 40 in the tapered recess or opening between the shoe and the collar. Interposed between the roller 40 and the shoulder 39 is a spring 41 which normally tends to force the roller toward the narrow portion of the opening or recess between the shoe and the collar. With this arrangement it will be seen that the collar 30 may be turned freely in an anti-clockwise direction as the pin 40 occupies the wider portion of the recess between the shoe and the collar, but a very slight movement of the collar 30 in a clockwise direction causes the roller 40 to move up the inclined surface 37, and to effectively wedge in the narrower portion of the opening and lock the collar against further rotatory movement in that direction, and at the same time forces the shoe into firm clamping engagement with the surface of the sleeve 6, and prevents both rotary and longitudinal movement of said sleeve in the base or support 1. However, when the collar has been moved in anti-clockwise direction to release the pressure imposed by the pin or rolling element 40 on the shoe 36, the sleeve 6, and the tool spindle carried thereby, may be freely rotated and freely adjusted longitudinally of the bore in the base or support, the latter movement providing for the large and quick adjustments of the tool spindle with respect to the work.

What I claim is:—

1. A machine for facing valve seats and the like, comprising a support including means for securing the same to a valve casing, a sleeve slidably and rotatably mounted in said support, a tool spindle journalled and axially adjustable in said sleeve, a collar rotatable on said support, a shoe mounted in said support having an arcuate face engaging the sleeve and an opposite face eccentric to said arcuate face, and a rolling element interposed between the inner face of said collar and the eccentric face of the shoe.

2. A machine for facing valve seats and the like, comprising a support including means for securing the same to a valve casing, a sleeve slidably and rotatably mounted in said support, a tool spindle journalled and axially adjustable in said sleeve, a collar rotatable on said support, a disk-shaped shoe mounted in said support having an arcuate face engaging the sleeve and an opposite face eccentric to said arcuate face, and a roller interposed between the inner face of said collar and the eccentric face of the shoe.

3. A machine for facing valve seats and the like, comprising a support including means for securing the same to a valve casing, a sleeve slidably and rotatably mounted in said support, a tool spindle journalled and axially adjustable in said sleeve, a collar rotatable on said support, a shoe mounted in said support having an arcuate face engaging the sleeve and an opposite face eccentric to said arcuate face, a rolling element interposed between the inner face of said collar and the eccentric face of the shoe, and a spring tending to force the rolling element up the eccentric face.

4. A machine for facing valve seats and the like, comprising a support including means for securing the same to a valve casing, a sleeve slidably and rotatably mounted in said support, a tool spindle journalled and axially adjustable in said sleeve, a collar rotatable on said support, a disk-shaped shoe mounted in said support having an arcuate face engaging the sleeve and an opposite face eccentric to said arcuate face, a roller interposed between the inner face of said collar and the eccentric face of the shoe, and a spring tending to force the roller up the eccentric face.

In testimony whereof I affix my signature.

HUGH M. ALBEE.